United States Patent [19]

Leander

[11] 3,925,846
[45] Dec. 16, 1975

[54] METHOD OF REMOVING THE HARD AND SOFT ROE SACKS, RESPECTIVELY, FROM FISHES AND APPARATUS FOR CARRYING OUT THIS METHOD

[75] Inventor: Leif Leander, Vastra Frolunda, Sweden

[73] Assignee: Arenco KM-AB, Vastra Frolunda, Sweden

[22] Filed: Feb. 7, 1974

[21] Appl. No.: 440,388

[30] Foreign Application Priority Data
Feb. 22, 1973 Sweden .............................. 7302338

[52] U.S. Cl. .............................. 17/60; 17/58; 17/59
[51] Int. Cl.[2] .......................................... A22C 25/14
[58] Field of Search .............. 17/58, 59, 60, 63, 52, 17/45, 57

[56] References Cited
UNITED STATES PATENTS

| | | | |
|---|---|---|---|
| 2,345,607 | 4/1944 | Kaplan | 17/58 |
| 2,750,623 | 6/1956 | Baader | 17/52 |
| 3,187,376 | 6/1965 | Laws | 17/58 |
| 3,319,284 | 5/1967 | Schlichting | 17/63 |

FOREIGN PATENTS OR APPLICATIONS

| | | | |
|---|---|---|---|
| 156,511 | 5/1954 | Australia | 17/58 |
| 1,117,939 | 3/1956 | France | 17/58 |
| 335,409 | 5/1971 | Sweden | |
| 333,233 | 3/1971 | Sweden | |
| 2,030,754 | 3/1971 | Germany | |

*Primary Examiner*—Robert Peshock
*Assistant Examiner*—James D. Hamilton
*Attorney, Agent, or Firm*—Hubbell, Cohen, & Stiefel

[57] ABSTRACT

A method of removing the hard and soft roe sacks, respectively, from fishes comprises the following steps. Firstly, the head of the fish is severed by a preferably V-shaped cut. Secondly, the belly of the fish is cut up in the longitudinal direction of the fish, the roe sacks of the fish being prevented from engagement with the edge of the cutting tool. Subsequently, pressure is applied against the two opposite sides of the fish within an initially narrow region, which is located between the longitudinal central lines of the roe sacks and the upper contour of these sacks. This region of pressure is successively displaced and/or widened downwards, whereby the roe sacks are successively squeezed out through the opening in the belly of the fish. Finally, the roe sacks are removed.

14 Claims, 10 Drawing Figures

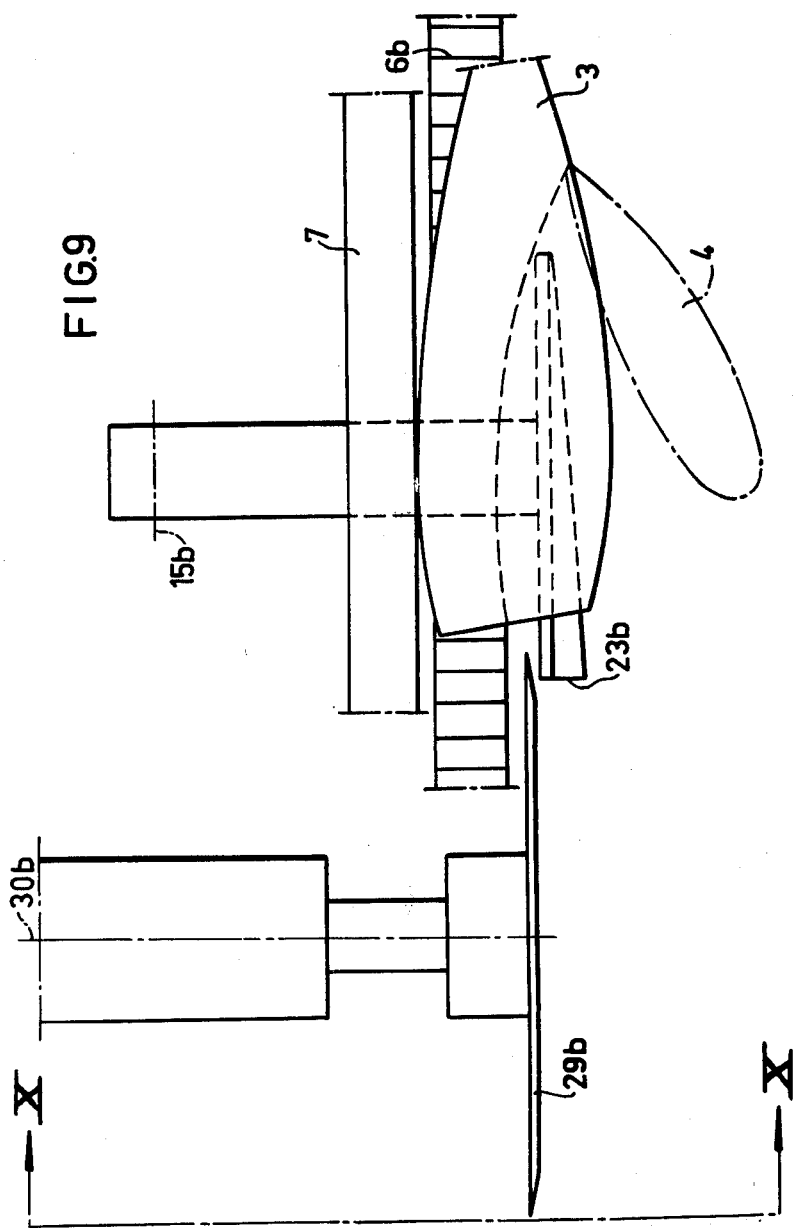

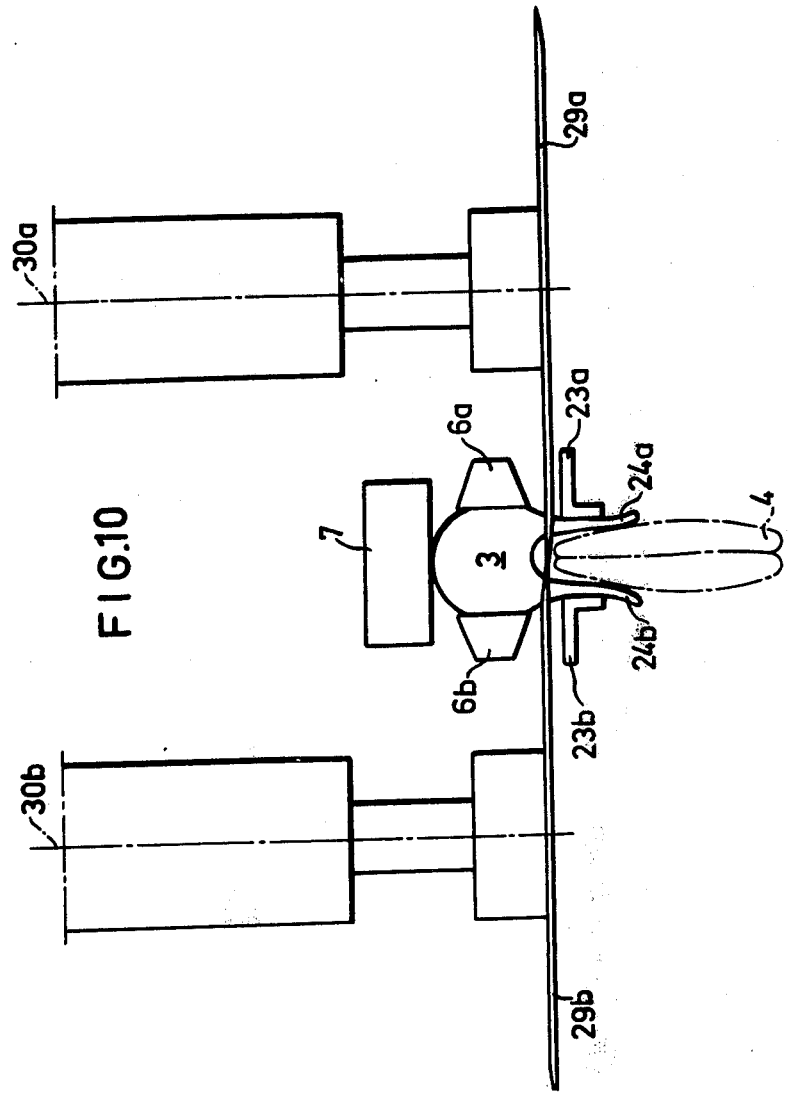

3,925,846

METHOD OF REMOVING THE HARD AND SOFT ROE SACKS, RESPECTIVELY, FROM FISHES AND APPARATUS FOR CARRYING OUT THIS METHOD

This invention relates to a method of removing the hard and soft roe sacks, respectively, from fishes and apparatus for carrying out this method.

The principle object of the invention is to provide a method and an apparatus for removing the hard and soft roe sacks, respectively, in a substantially whole and undamaged condition.

SUMMARY OF THE INVENTION

With this and other objects in view the method according to the invention comprises the following steps in the order set forth below:

a. severing the head of the fish by a preferably substantially V-shaped cut, the sectional areas of which form an acute angle with the longitudinal direction of the fish;

b. cutting up the belly of the fish in the longitudinal direction of the fish by an edged cutting tool, the hard and soft roe sacks, respectively, of the fish, being prevented from engagement with the edge of the cutting tool;

c. applying pressure, substantially symmetrically, against the two opposite sides of the fish within an initially narrow region, which in respect of the vertical transverse direction of the fish is located between the longitudinal central lines of the hard and soft roe sacks, respectively, and the upper contour of these sacks and which is successively displaced and/or widened downwards, in the direction towards the belly of the fish for successive squeezing out of the hard and soft roe sacks, respectively, through the opening cut in the belly of the fish; and d. removing the dependent hard and soft roe sacks, respectively.

The apparatus for carrying out this method comprises the following, successively operative processing stations:

a. a head severing station having means for severing the head of the fish by a cut, the sectional areas of which form an acute angle with the longitudinal direction of the fish;

b. a belly cutting up station which comprises an edged cutting tool for cutting the belly of the fish in its longitudinal direction, and protective means for preventing engagement of the hard and soft roe sacks, respectively, with the edge of the cutting tool;

c. a hard and soft roe sack, respectively, squeezing out station comprising compressing means, which are substantially symmetrically located with respect to the sides of the fish and are pressable preferably elastically against an initially narrow area of said sides, which is in respect of the vertical transverse direction of the fish located between the longitudinal central lines of the hard and soft roe sacks respectively and the upper contour of these sacks and which is successively displaced and/or widened downwards, in the direction towards the belly of the fish for successive squeezing out of the hard and soft roe sacks, respectively, through the opening cut in the belly of the fish; and d. a separation station having means for removing the dependent hard and soft roe sacks, respectively, preferably together with the belly sides of the fish; in combination with transport means for advancing the fish substantially perpendicularly to its longitudinal direction through the head severing station and substantially in the lonitudinal direction of the fish through the subsequent stations, in the order stated above.

BRIEF DESCRIPTION OF THE DRAWINGS

FIGS. 9–10 illustrate the end station of the apparatus according to the invention in a simplified side elevation and as seen in the direction of the arrow X—X in FIG. 9, respectively.

DETAILED DESCRIPTION OF THE PREFERRED EMBODIMENT

Figure 1:
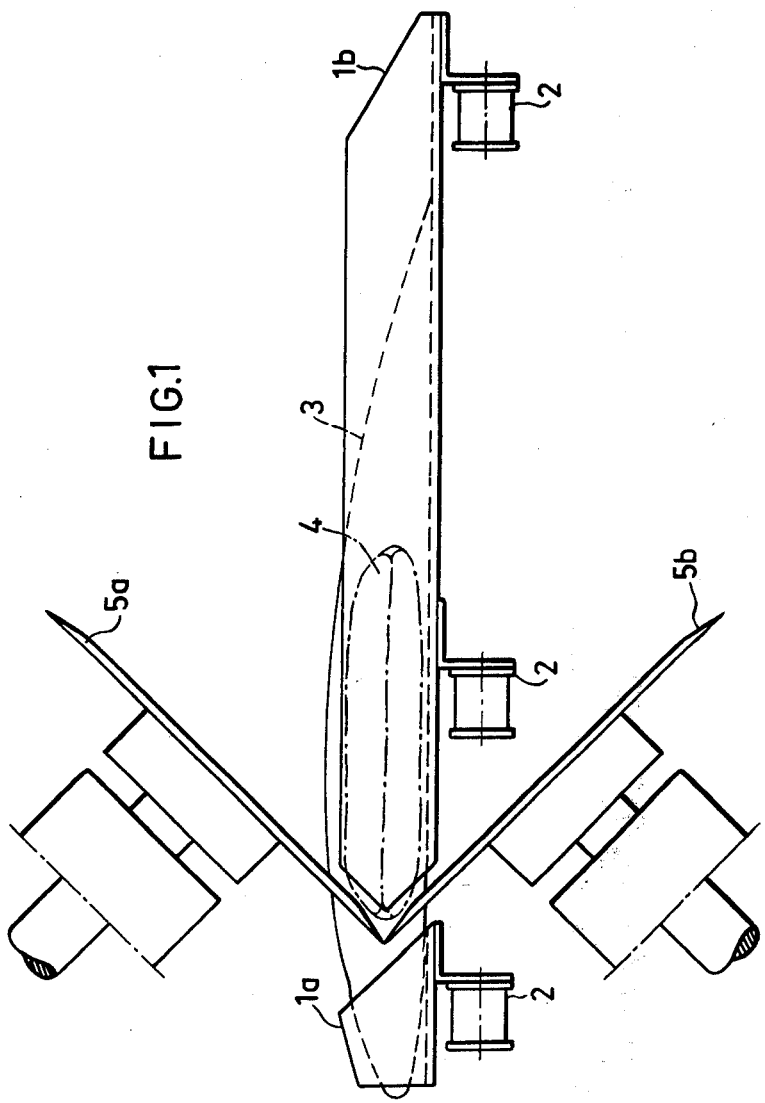
FIG. 1 is a side view, as seen in the direction of advancement of the fishes, of a station for cutting off or severing the head of the fish from the remainder of the fish body, said station forming part of a fish processing machine.

In all Figures the same reference numerals designate same or similar members or details. All of the above-mentioned stations are comprised in a fish processing machine, whose framework, interconnecting said stations, has been omitted as well as other members which are not important for the understanding of the invention.

The fishes enter the head severing station shown in FIG. 1 lying in individual compartments. Each compartment consists of a head part 1a which carries the head of the fish and a body part 1b which carries the fish body. A great number of compartments are arranged in an endless path which is held together and advanced by chains 2 or the like. The fish which lies on its side in FIG. 1 is designated 3 in this and subsequent Figures, and is advanced sidewise by the chains 2. The hard and soft roe sacks, respectively (in dependence of the sex, i.e., female or male, respectively, of the fish; the soft roe sack have substantially the same shape and location as the hard roe sacks) are designated 4. 5a and 5b are rotary circular knives which, as seen in a cross section through their rotational axes, substantially from a V and which sever the head of the fish by a substantially V-shaped cut the foremost portion of which located nearest to the apex of the V passes through the back, the head and the belly side of the fish and the rear portions of which located remote from the apex of the V pass through the sides of the fish. The V-shaped course of this cut, which passes immediately ahead of the hard and soft roe sacks depends on the fact that these roe sacks are rounded in front and extend into the head of the fish. In a modification of the head severing station the circular knives 5a, 5b may both lie in one and the same plane which intersects the fish body at an acute angle, as seen in a side view.

Figure 2:
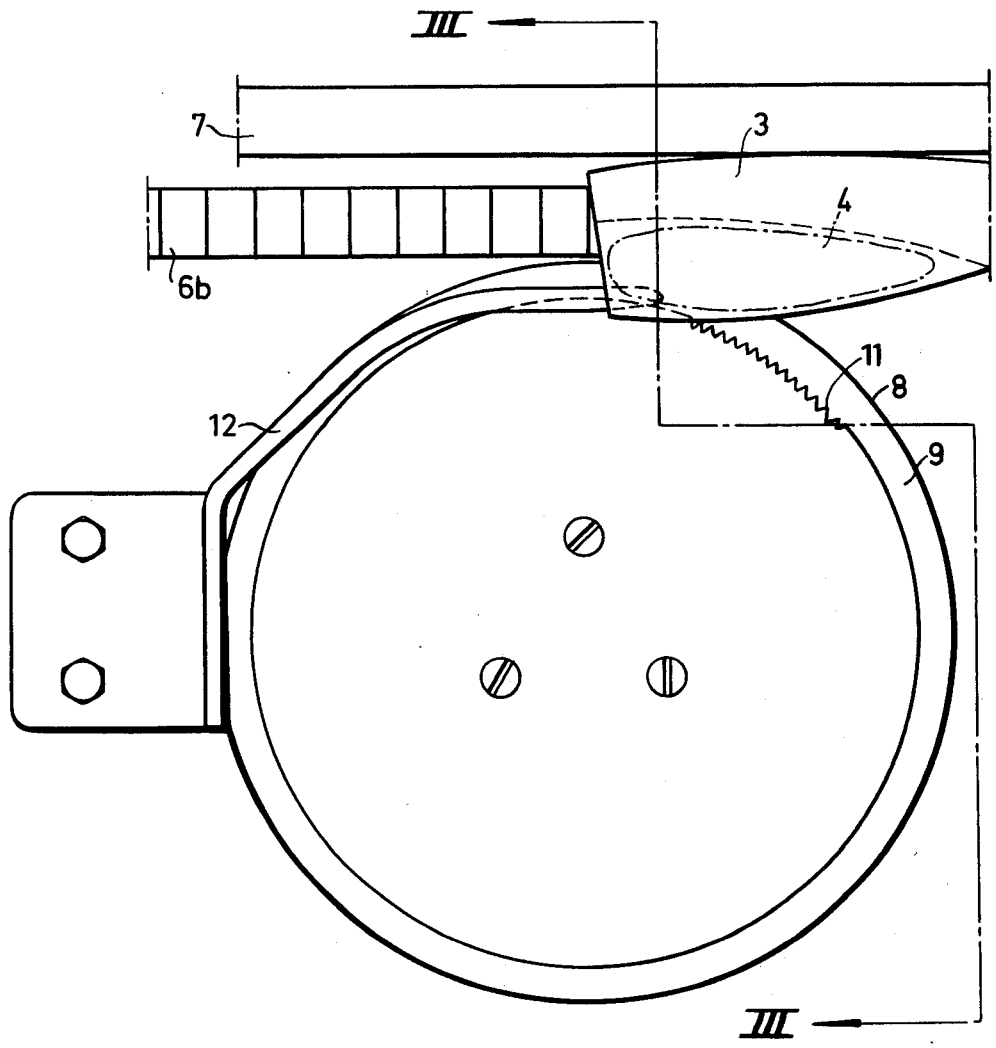
FIG. 2 is a side view, as seen perpendicularly to the direction of advancement, of a station for cutting up the belly of the fish, also comprised in a fish processing machine.
Figure 3:
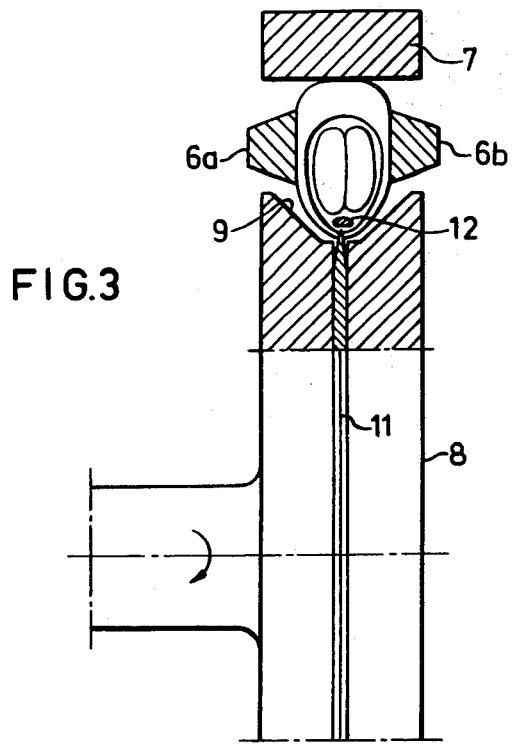
FIG. 3 is a cross sectional view on line III—III in FIG. 2.

From the head severing station the headless fish is subsequently advanced in its longitudinal direction by means of a pair of suitably fluted or serrated belts 6a, 6b into a belly cutting station which is illustrated in FIGS. 2 and 3, the back of the fish abutting a pressure rail 7 or the like. Below said rail 7 there is provided a fish supporting, rotatable wheel 8, the circumference of which has a groove 9, which is substantially V-shaped as seen in a radial cross section and into which the fish 3 is introduced by the belts 6a, 6b with its belly facing downwards. The wheel 8 is comprised of two identical, truncated conical halves, the smaller bases of which face each other. Between the halves of the wheels there is inserted a circular knife, the preferably serrated edge 11 of which projects from the bottom of the groove 9. The upper quadrant of the knife 11, which is located foremost in the direction of advancement of the fish 3, is covered by a convex (upwards) covering rail 12, which has an arcuate cross section and the free end of which projects beyond a vertical plane through the rotational axis of the knife 11. This covering rail 12 has a double function. Firstly, it penetrates into the fish body and forms a firm dolly or a scissor blade with a recess, in which the rotating knife edge 11 penetrates and cuts up the belly of the fish. Secondly, the rail 12 prevents the knife edge 11 from damaging the delicate hard and soft roe sacks 4 respectively, after that the belly has been cut up.

Figure 6:
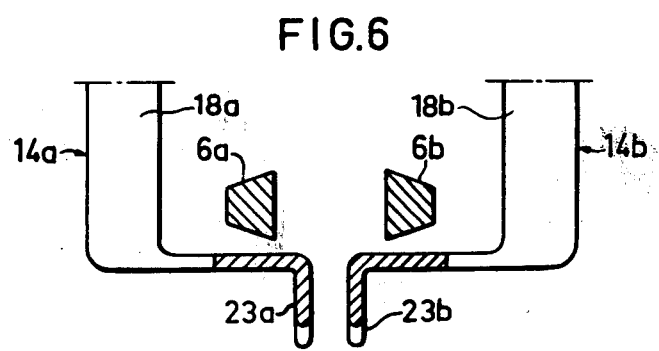
FIG. 6 is a vertical cross sectional view on line VI—VI in FIG. 5.
Figure 4:
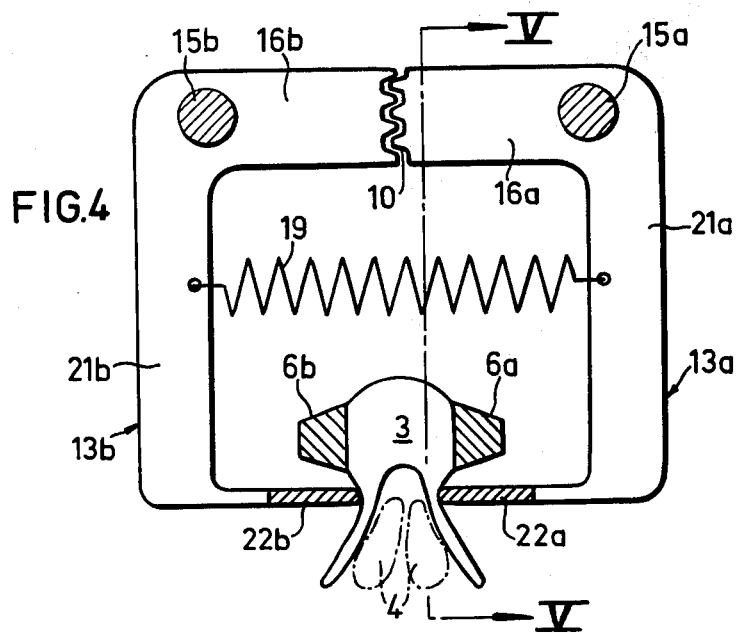
FIG. 4 is a cross sectional view on line IV—IV in FIG. 5 and illustrates a fish which is omitted in FIG. 5.
Figure 5:
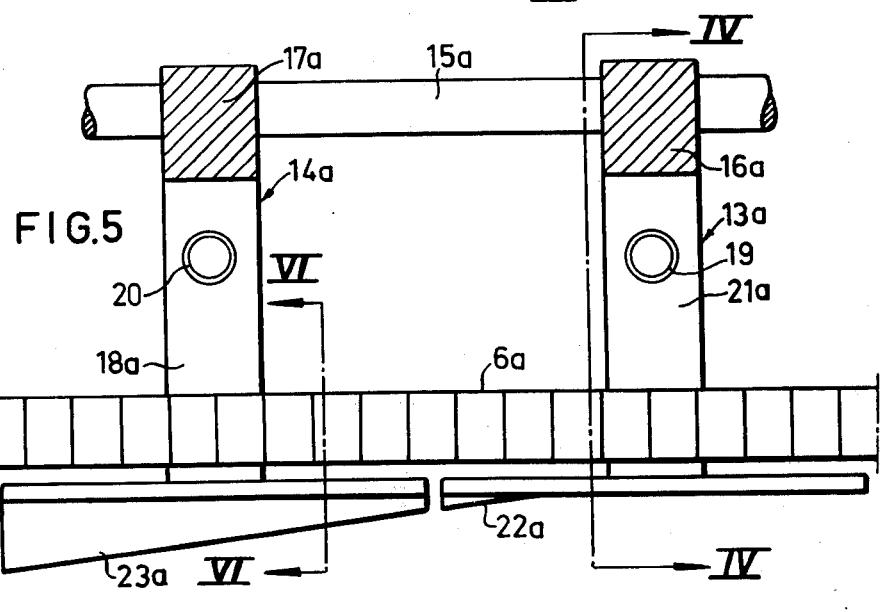
FIG. 5 is a substantially central longitudinal section on line V—V in FIG. 4.

In the roe sack pressing out operation, which is carried out in a third station, which is illustrated in FIGS. 4–6, the hard or soft roe sacks 4, respectively, are squeezed out through the opening in the belly of the fish, which has been cut by the knife edge 11. This station comprises in the embodiment illustrated in FIGS. 4–6, in addition to the fish advancing belts 6a, 6b two pairs of clamps which have a substantially U-shaped cross section and which are generally designated 13a, 13b and 14a, 14b, respectively. The clamps 13a, 13b and 14a, 14b, are symmetrically arranged with respect to a vertical plane extending between the advancing belts 6a, 6b and are pivotable on the stub shafts 15a and 15b respectively, which are located in the transition between a shank portion and the base portion of the respective U. The free ends of those shanks 16a, 16b and 17a, 17b of the clamps 13, 14 which are located nearest to the pivot axle 15 are formed into toothed sectors 10 which engage into each other pairwise. The bases 21a and 21b respectively, of the clamps 13a, 13b are, like the bases 18a and 18b respectively of the clamps 14a, 14b interconnected by tensions springs 19 and 20, of which the lastmentioned one, which is located foremost in the direction of travel of the belts 6 and the fishes 3, may be stronger than the firstmentioned one. The free ends of the lower shanks of the clamps 13a, 13b and 14a, 14b are formed into rails 22a, 22b and 23a, 23b, respectively, the longitudinal direction of which is substantially parallel to the direction of movement of the fish 3. The rails 22, 23, which are located immediately below the fish advancing belts 6a, 6b are substantially wedge-shaped, at least on those of their sides which face the vertical, longitudinal symmetry plane between the fish advancing belts 6a, 6b, and taper, i.e., decrease in height in the opposite direction with respect to the direction of travel of the belts 6.

The apparatus described above operates as follows:

The fish 3 is introduced by the belts 6 between the rails 22, which by the influence of the tension spring 19 elastically press against the sides of the fish on a level, which is located between the longitudinal central line of the hard and soft roe sacks, respectively, and the upper contour of the roe sacks. On account of this pressure, the hard and soft roe sacks 2, respectively, are pressed downwards, into the opening in the belly of the fish cut by the knife edge 11, As the advancement of the fish 3 continues, the area is widened within which the wedge-shaped rails 22 and subsequently also 23 press against the fish 3 in the direction downwards, simultaneously as the pressure is increased when the spring 20 is tightened on account of the fact that the fish is introduced between the rails 23a, 23b. The consequence hereof is that the hard and soft roe sacks 4, respectively, are squeezed out through the opening in the belly of the fish with their fore ends first.

Figure 7:
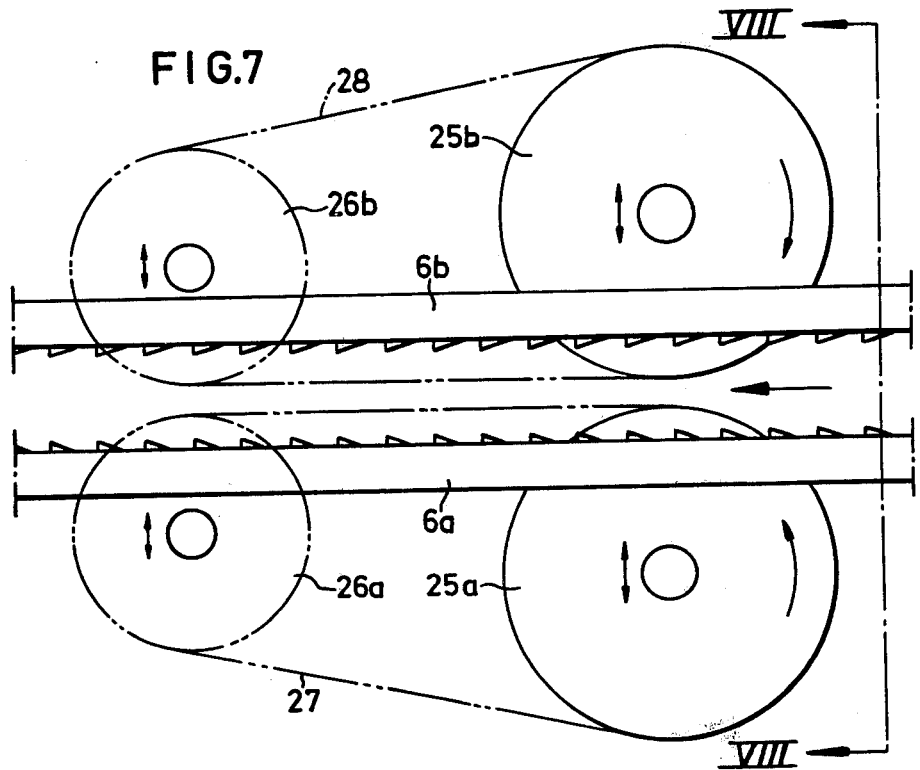
FIG. 7 is a simplified plan view illustrating a modification of the roe squeezing out station according to FIGS. 4–6.
Figure 8:
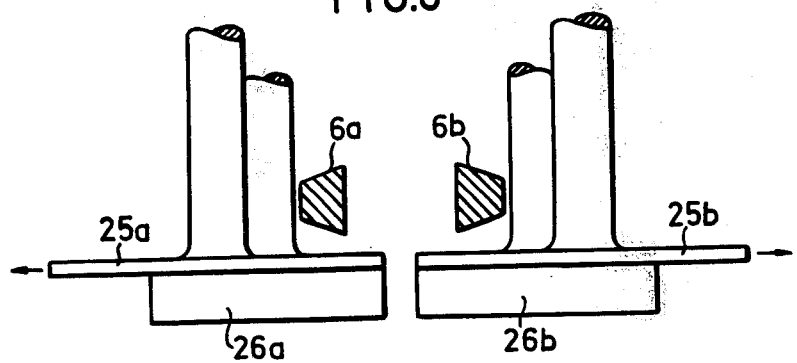
FIG. 8 is an elevation of the station according to FIG. 7 as seen in the direction of the arrow VIII—VIII.

FIGS. 7 and 8 illustrate a modification of the apparatus according to FIGS. 4–6. Thus, in FIGS. 7 and 8 the rails 22a, 22b and 23a, 23b of FIGS. 4–6 have been replaced by rotatable rollers 25a, 25b and 26a, 26b, respectively, of which the lastmentioned ones are located on a lower level and have greater axial height than the firstmentioned ones, as is shown in FIG. 8. The rotational direction of the rollers 25, 26 is indicated by arrows, and in addition hereto the rollers are resiliently movable perpendicularly to the belts 6 as are the rails 22, 23, as is also indicated by arrows. Alternatively, belts 27, 28 which are shown by chain lines may run over the rollers 25a, 26a and 25b, 26b, respectively. The rollers 25a, 25b and/or 26a, 26b are suitably driven.

In FIGS. 9 and 10 there is illustrated, in side view and end view, respectively, the last station comprised in the apparatus according to the invention. In this station the dependent hard and soft roe sacks 4, respectively, and the belly walls 24a, 24b of the fish 3, which are now separated, are cut off by means of a pair of cooperating circular knives 29a, 29b. These knives are rotated on axles 30a, 30b, which are located in a plane which is substantially perpendicular to the longitudinal direction of the belts 6.

The embodiments described above and illustrated in the drawings are, of course, to be regarded merely as non-limiting examples and may as to their details be modified in several ways within the scope of the following claims. Thus, for instance, the rollers 26 illustrated in FIGS. 7 and 8 may be located on a lower level than the rollers 25 without having a greater extension in the axial direction than these. Furthermore, it is possible, at least in some instances, to have only one pair of rails 22, 23 or rollers 25, 26, respectively, instead of two pairs. In this case the rollers of this single pair may be made higher than the fish 3, so that these rollers may squeeze out the hard and soft roe sacks, respectively, through the opening formed by the cutting off the head of the fish. Furthermore, new embodiments, which are also within the scope of the following claims, may be created by combining details taken from different ones of the embodiments described above.

What I claim is:

1. Apparatus for removing the hard and soft roe sacks, respectively, from a fish, comprising:

a. a head severing station including means for severing the head of the fish by a V-shaped cut, the legs of which extend transversely of and at acute angles to the longitudinal direction of the fish;

b. a belly cutting station which comprises an edged cutting tool for cutting the belly of the fish in its longitudinal direction, and protective means for preventing engagement of the hard and soft roe sacks, respectively, with the edge of the cutting tool;

c. a hard and soft roe sack, respectively, squeezing out station comprising compressing means which are located for substantially symmetrical engagement with the sides of the fish and are pressable against an initially narrow area of said fish located between the longitudinal central lines of the hard and soft roe sacks, respectively, and the upper contour of said sacks, and means for successively displacing said compressing means downwards towards the belly of the fish, for successively squeezing out of the hard and soft roe sacks, respectively, through the opening cut in the belly of the fish;

d. a separation station including means for removing the dependent hard and soft roe sacks, respectively; and e. transport means for advancing the fish first substantially perpendicular to its longitudinal direction through the head severing station and then substantially in the longitudinal direction of the fish through the subsequent stations, in the order stated above.

2. Apparatus according to claim 1, in which said head severing means comprises a pair of rotatable circular knives disposed in vertical planes which intersect to form a V whose legs extend forwardly at said acute angles to said longitudinal axis to sever the head of the fish by said V-shaped cut, whereby the front portion of said cut, located nearest to the apex of the V, passes through the back, the head and the belly side of the fish and the rear portions of which, located remote from the apex of the V, pass through two opposite sides of the fish.

3. Apparatus according to claim 1, wherein said belly cutting station further comprises a fish support wheel having a V-shaped groove in the circumference thereof and wherein said edged cutting tool is a circular knife projecting upwardly from the bottom of said V-shaped groove.

4. Apparatus according to claim 3, in which said belly cutting up station further comprises protective means including a covering rail for covering a portion of the circumference of the knife edge for preventing engagement between said knife edge and the hard and soft roe sacks, respectively, of the fish.

5. Apparatus according to claim 1, in which said compressing means of said squeezing out station comprises at least one pair of longitudinally extending, substantially wedge-shaped rails which converge in the direction of advancement of the fish.

6. Apparatus according to claim 5, further comprising a second pair of said rails spaced from said first pair in the direction of advancement of the fish.

7. Apparatus according to claim 1, in which said compressing means comprises at least one pair of spaced apart rotatable rollers for pressing against the opposite sides of a fish.

8. Apparatus according to claim 7, in which the pairs of rollers are two in number and are spaced from each other in the direction of advancement of the fish.

9. Apparatus according to claim 8, in which the pair of rollers disposed for later engagement with the fish during the advancement thereof, have a greater height, as measured in the direction of their respective rotational axes, than the rollers of the other pair.

10. Apparatus according to claim 8, in which the two pairs of rollers are arranged below the means for advancing the fish, and in which the rollers of that pair of rollers, disposed for later engagement of said fish are located further below the means for advancing the fish than are the rollers of the other pair.

11. Apparatus according to claim 8, further comprising a pair of endless belts, each of which runs over one roller from each of the pairs of rollers, and means for pressing each of said belts against one of the two sides of the fish.

12. Apparatus according to claim 1, wherein said separation station comprises a pair of cooperating, rotatable circular knives for cutting loose the hard and soft roe sacks, respectively, hanging down through the opening in the belly of the fish.

13. Method of removing the hard and soft roe sacks, respectively, from fishes, comprising the following steps in the order set forth below:

a. severing the head of the fish by a cut in the shape of a V, the legs of which extend transversely of and at acute angles to the longitudinal direction of the fish;

b. cutting up the belly of the fish in the longitudinal direction of the fish by an edged cutting tool while preventing engagement of the hard and soft roe sacks, respectively, with the edge of the cutting tool;

c. applying pressure, substantially symmetrically, against the two opposite sides of the fish in an initially narrow region located between the longitudinal central lines of the hard and soft roe sacks, respectively, and the upper contour of these sacks, and progressively shifting the center of said region downwardly towards the belly of the fish, for successive squeezing out of the hard and soft roe sacks, respectively, through the opening cut in the belly of the fish; and d. removing the dependent hard and soft roe sacks, respectively.

14. Method according to claim 13, in which the dependent hard and soft roe sacks, respectively, are cut away, preferably together with the side walls of the fish belly.

* * * * *

PO-1050
(5/69)

UNITED STATES PATENT OFFICE
CERTIFICATE OF CORRECTION

Patent No. 3,925,846    Dated December 16, 1975

Inventor(s) LEIF LEANDER

It is certified that error appears in the above-identified patent and that said Letters Patent are hereby corrected as shown below:

[30] Foreign Application Priority Data: "Feb. 22, 1973" should read --Feb. 20, 1973--.

Signed and Sealed this fifteenth Day of June 1976

[SEAL]

Attest:

RUTH C. MASON
Attesting Officer

C. MARSHALL DANN
Commissioner of Patents and Trademarks